(12) United States Patent
Uchida et al.

(10) Patent No.: US 7,403,248 B2
(45) Date of Patent: Jul. 22, 2008

(54) LIQUID CRYSTAL DISPLAY DEVICE

(75) Inventors: Toshihisa Uchida, Matsusaka (JP);
Koichi Miyachi, Seika-cho (JP);
Masumi Kubo, Ikoma (JP); Nobuhiko Nakai, Taki-cho (JP); Hidehiko Ohkura, Taki-cho (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/376,454

(22) Filed: Mar. 3, 2003

(65) Prior Publication Data

US 2003/0169391 A1    Sep. 11, 2003

(30) Foreign Application Priority Data

Mar. 8, 2002  (JP)  .............................. 2002-063796

(51) Int. Cl.
*G02F 1/13363*  (2006.01)

(52) U.S. Cl. ...................... 349/119; 349/117; 349/118; 349/120; 349/130

(58) Field of Classification Search ................. 349/117, 349/119

See application file for complete search history.

(56) References Cited

U.S. PATENT DOCUMENTS

| | | | | |
|---|---|---|---|---|
| 5,107,356 A | * | 4/1992 | Castleberry | ................ 349/119 |
| 5,550,661 A | * | 8/1996 | Clark et al. | .................. 349/117 |
| 6,281,956 B1 | | 8/2001 | Ohmuro et al. | |
| 6,292,242 B1 | * | 9/2001 | VanderPloeg et al. | ........ 349/118 |
| 6,307,608 B1 | | 10/2001 | Sakamoto | .................... 349/119 |
| 6,339,460 B1 | * | 1/2002 | Saitoh | ......................... 349/117 |
| 6,417,892 B1 | * | 7/2002 | Sharp et al. | .................. 348/742 |
| 6,512,561 B1 | | 1/2003 | Terashita et al. | ............. 349/118 |

(Continued)

FOREIGN PATENT DOCUMENTS

JP    2000-284290    10/2000

OTHER PUBLICATIONS

J. Chen et al., Optimum Film Compensation Modes for TN and VA LCDs, SID Digest 1998, pp. 315-318.*

(Continued)

*Primary Examiner*—David C. Nelms
*Assistant Examiner*—Matthew P Lawson
(74) *Attorney, Agent, or Firm*—Nixon & Vanderhye P.C.

(57) ABSTRACT

The liquid crystal display device of the invention includes: a liquid crystal layer taking on a roughly vertically aligned state in the black display state: first and second polarizing plates placed to face each other so that the transmission axes are orthogonal to each other; at least one first phase plate placed between the liquid crystal layer and the first polarizing plate and/or the second polarizing plate; at least one second phase plate placed between the first phase plate and the first or second polarizing plate whichever is farther from the first phase plate; and an illuminator for illuminating the liquid crystal layer with light via the first or second polarizing plate. The first phase plate has biaxial optical anisotropy and has functions of compensating part of thickness-direction retardation of the liquid crystal layer in the black display state and suppressing light leakage caused by deviation of the transmission axes of the first and second polarizing plates from the mutual orthogonal relationship in a tilted viewing angle direction. The second phase plate has negative uniaxial optical anisotropy and has a function of compensating the thickness-direction retardation of the liquid crystal layer in the black display state in cooperation with the first phase plate.

24 Claims, 4 Drawing Sheets

U.S. PATENT DOCUMENTS

| | | | |
|---|---|---|---|
| 6,628,359 B1 * | 9/2003 | Terashita et al. | 349/120 |
| 6,630,975 B1 * | 10/2003 | Terashita | 349/139 |
| 6,642,981 B1 | 11/2003 | Ohmura et al. | 349/117 |
| 2001/0030726 A1 * | 10/2001 | Yoshida et al. | 349/117 |
| 2001/0048497 A1 * | 12/2001 | Miyachi et al. | 349/117 |
| 2002/0047968 A1 * | 4/2002 | Yoshida et al. | 349/117 |
| 2006/0028601 A1 * | 2/2006 | Kawahara et al. | 349/117 |

OTHER PUBLICATIONS

Korean Office Action mailed Mar. 14, 2005 (w/English translation thereof).

* cited by examiner

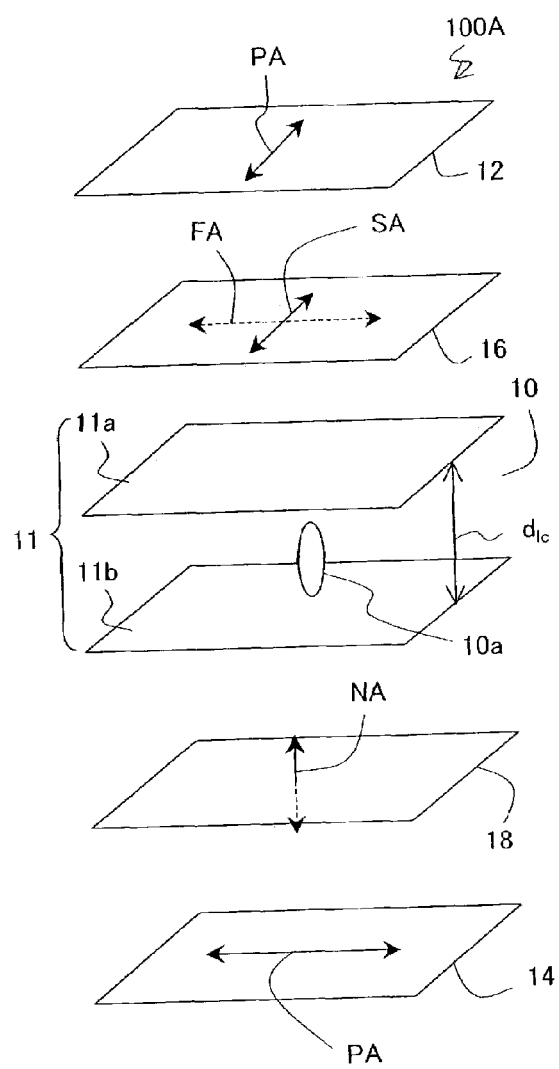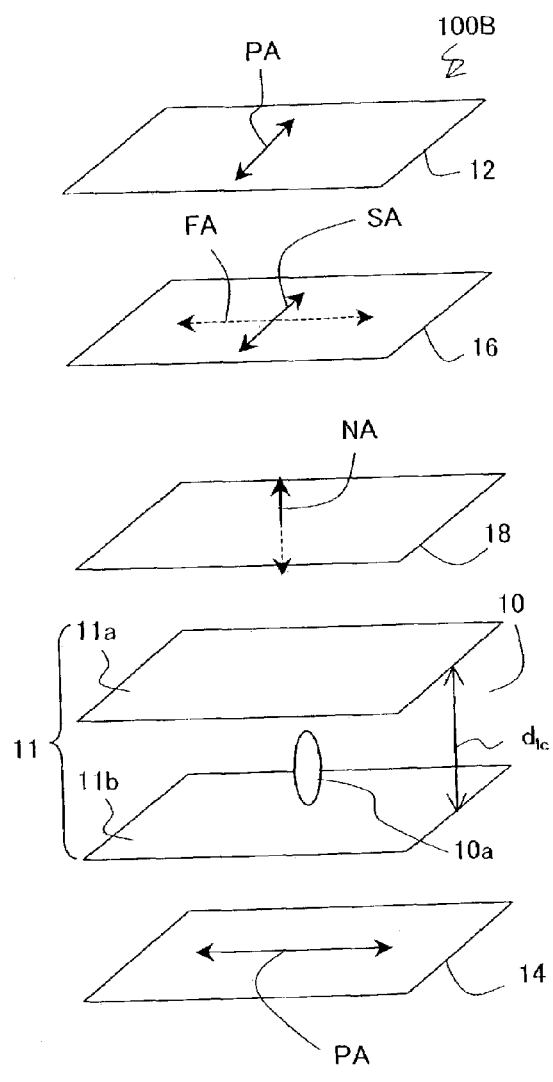

LIQUID CRYSTAL DISPLAY DEVICE

BACKGROUND OF THE INVENTION

The present invention relates to a liquid crystal display device, and more particularly, to a liquid crystal display device presenting black display when the liquid crystal layer thereof takes on a roughly vertically aligned state.

In recent years, liquid crystal display devices have come into wide use thanks to their improvement in display quality. However, further improvement in display quality is yet strongly desired.

One of the display properties of liquid crystal display devices of which further improvement is demanded is reduction in viewing angle dependence of display quality. That is, it is desired to develop a liquid crystal display device capable of presenting display with a sufficiently high contrast ratio even when observed in a direction tilted with respect to the normal to the display plane (the direction is defined by the viewing angle). In other words, widening of the viewing angle of a liquid crystal display device is desired.

To improve the contrast ratio of display presented by a liquid crystal display device, it is important to suppress light leakage in the black display state. In this aspect, a liquid crystal display device presenting black display when the liquid crystal layer thereof takes on a roughly vertically aligned state is advantageous. Examples of such a liquid crystal display device include a normally-white mode TN type liquid crystal display device and a normally-black mode vertically aligned type liquid crystal display device. These types of liquid crystal display devices present black display using a roughly vertically aligned liquid crystal layer and a pair of polarizing plates placed to face each other via the liquid crystal layer in a crossed-Nicols state. The black display presented by these liquid crystal display devices is good when observed in the direction normal to the display plane. However, when observed in a direction tilted from the normal to the display plane (hereinafter, such a direction is referred to as a "tilted viewing angle direction"), the black display degrades in quality due to occurrence of light leakage.

The light leakage in a tilted viewing angle direction occurs because (1) birefringence is generated when the liquid crystal layer in a vertically aligned state is observed in a tilted viewing angle direction and (2) the transmission axes of the pair of polarizing plates placed in the crossed-Nicols state are deviated from the mutual orthogonal relationship (the angle formed by the transmission axes exceeds 90°) when observed in a tilted viewing angle direction.

For example, Japanese Laid-Open Patent Publication No. 2000-39610 discloses that in a normally-black vertically aligned type liquid crystal display device, light leakage in a tilted viewing angle direction can be suppressed by (1) compensating retardation of a liquid crystal layer in the black display state with an optical sheet having negative uniaxial anisotropy and (2) providing an optical sheet having biaxial anisotropy that can be equivalent of a λ/2 plate (half-wave plate) having a slower axis parallel or perpendicular to the transmission axis (also called the polarization axis) of a polarizing plate.

However, when a uniaxial anisotropic optical sheet and a biaxial anisotropic optical sheet are designed according to the disclosure of the above publication, it is found that the selection range allowed for the biaxial anisotropic optical sheet capable of attaining good black display in a tilted viewing angle direction is so narrow that industrial use of this optical sheet is difficult.

Moreover, when the biaxial anisotropic optical sheet having in-plane retardation of 190 nm or more described in the above publication is used, it is found that the margin allowed for alignment between the slower axis of the biaxial anisotropic optical sheet and the transmission axis of the polarizing plate is small. Therefore, slight misalignment will cause light leakage even in the direction normal to the display plane, and this will degrade the front contrast ratio.

The aforementioned publication also describes that it is preferred to use a biaxial anisotropic optical sheet of which Nz (Nz=(nx−nz)/(nx−ny) where nx, ny and nz are the refractive indices of the biaxial anisotropic optical sheet in the slower axis direction, in the faster axis direction and in the thickness direction, respectively) is in the range of 0.28 to 0.67 (see FIG. 4). It is however difficult to industrially manufacture a biaxial anisotropic optical sheet having Nz of less than 1.0 (that is, nx>nz>ny).

SUMMARY OF THE INVENTION

In view of the above, an object of the present invention is to provide a liquid crystal display device presenting black display when the liquid crystal layer thereof takes on a roughly vertically aligned state, of which the display quality is improved by use of a biaxial phase plate excellent in productivity.

The liquid crystal display device of the present invention includes: a liquid crystal layer taking on a roughly vertically aligned state in a black display state; first and second polarizing plates placed to face each other via the liquid crystal layer so that transmission axes of the polarizing plates are orthogonal to each other; at least one first phase plate placed between the liquid crystal layer and the first polarizing plate and/or the second polarizing plate; at least one second phase plate placed between the at least one first phase plate and the first polarizing plate or the second polarizing plate whichever is farther from the at least one first phase plate; and an illuminator for illuminating the liquid crystal layer with light via either the first polarizing plate or the second polarizing plate, wherein the at least one first phase plate has biaxial optical anisotropy and has functions of compensating part of thickness-direction retardation of the liquid crystal layer in the black display state and suppressing light leakage caused by deviation of the transmission axes of the first polarizing plate and the second polarizing plate from mutual orthogonal relationship in a tilted viewing angle direction, and at least one second phase plate has negative uniaxial optical anisotropy and has a function of compensating the thickness-direction retardation of the liquid crystal layer in the black display state in cooperation with the at least one first phase plate.

The thickness-direction retardation of the liquid crystal layer in the black display state, $\Delta n \cdot d_{1c}$ (where $\Delta n$ is a birefringence of the liquid crystal layer and $d_{1c}$ is a thickness of the liquid crystal layer) preferably satisfies a relationship $200 \text{ nm} \leq \Delta n \cdot d_{1c} \leq 500 \text{ nm}$.

Preferably, the slower axis (x axis) of the at least one first phase plate having biaxial optical anisotropy is substantially parallel to the transmission axis of the first polarizing plate or the second polarizing plate whichever is on the same side as the at least one first phase plate with respect to the liquid crystal layer, and thickness-direction retardation ($Rth1=(nx-nz) \cdot d$) and in-plane retardation ($Re=(nx-ny) \cdot d$) of the at least one first phase plate satisfy a relationship $100 \text{ nm} \leq Rth1 + 1.9 \cdot Re \leq 500 \text{ nm}$ where nx, ny and nz are refractive indices of the at least one first phase plate in the direction of the slower axis, in the direction of a faster axis and in the direction of a thickness (d), respectively, the faster axis being in a plane including the slower axis and parallel to the liquid crystal layer and being orthogonal to the slower axis. More preferably, the thickness-direction retardation and the in-plane retardation satisfy a relationship 200 nm≦Rth1+1.9·Re≦400 nm.

The in-plane retardation Re of the at least one first phase plate preferably satisfies a relationship Re<190 nm, and more preferably satisfies a relationship Re≦150 nm.

The at least one first phase plate preferably satisfies a relationship nx>ny>nz.

Alternatively, the liquid crystal display device of the present invention includes: a liquid crystal layer taking on a roughly vertically aligned state in a black display state; first and second polarizing plates placed to face each other via the liquid crystal layer so that transmission axes of the polarizing plates are orthogonal to each other; at least one first phase plate placed between the liquid crystal layer and the first polarizing plate and/or the second polarizing plate; at least one second phase plate placed between the at least one first phase plate and the first polarizing plate or the second polarizing plate whichever is farther from the at least one first phase plate; and an illuminator for illuminating the liquid crystal layer with light via either the first polarizing plate or the second polarizing plate, wherein thickness-direction retardation of the liquid crystal layer in the black display state, $\Delta n \cdot d_{lc}$ (where $\Delta n$ is a birefringence of the liquid crystal layer and $d_{lc}$ is a thickness of the liquid crystal layer), satisfies a relationship 200 nm≦$\Delta n \cdot d_{lc}$≦500 nm, the at least one first phase plate has biaxial optical anisotropy, and a slower axis of the at least one first phase plate is substantially parallel to the transmission axis of the first polarizing plate or the second polarizing plate whichever is on the same side as the at least one first phase plate with respect to the liquid crystal layer, and thickness-direction retardation (Rth1=(nx−nz)·d) and in-plane retardation (Re=(nx−ny)·d) of the at least one first phase plate satisfy relationships 100 nm≦Rth1+1.9·Re≦500 nm and Re<190 nm where nx, ny and nz are refractive indices of the at least one first phase plate in the direction of the slower axis, in the direction of a faster axis and in the direction of a thickness (d), respectively, the faster axis being in a plane including the slower axis and parallel to the liquid crystal layer and being orthogonal to the slower axis.

The at least one first phase plate preferably satisfies a relationship nx>ny>nz.

The at least one first phase plate preferably satisfies a relationship 0 nm<Rth−Re≦100 nm Alternatively, the liquid crystal display device of the present invention includes: a liquid crystal layer taking on a roughly vertically aligned state in a black display state; first and second polarizing plates placed to face each other via the liquid crystal layer so that transmission axes of the polarizing plates are orthogonal to each other; at least one first phase plate placed between the liquid crystal layer and the first polarizing plate and/or the second polarizing plate; at least one second phase plate placed between the at least one first phase plate and the first polarizing plate or the second polarizing plate whichever is farther from the at least one first phase plate; and an illuminator for illuminating the liquid crystal layer with light via either the first polarizing plate or the second polarizing plate, wherein thickness-direction retardation of the liquid crystal layer in the black display state, $\Delta n \cdot d_{lc}$ (where $\Delta n$ is a birefringence of the liquid crystal layer and $d_{lc}$ is a thickness of the liquid crystal layer), satisfies a relationship 200 nm≦$\Delta n \cdot d_{lc}$≦500 nm, the at least one first phase plate has biaxial optical anisotropy, and a slower axis (x axis) of the at least one first phase plate is substantially parallel to the transmission axis of the first polarizing plate or the second polarizing plate whichever is on the same side as the at least one first phase plate with respect to the liquid crystal layer, and thickness-direction retardation (Rth1=(nx−nz)·d) and in-plane retardation (Re=(nx−ny)·d) of the at least one first phase plate satisfy relationships 100 nm≦Rth1+1.9·Re≦500 nm and nx>ny>nz where nx, ny and nz are refractive indices of the at least one first phase plate in the direction of the slower axis, in the direction of a faster axis and in the direction of a thickness (d), respectively, the faster axis being in a plane including the slower axis and parallel to the liquid crystal layer and being orthogonal to the slower axis.

The in-plane retardation Re of the at least one first phase plate preferably satisfies a relationship Re<190 nm, and more preferably satisfies a relationship Re≦150 nm.

The liquid crystal display device described above preferably further includes an additional second phase plate having negative uniaxial optical anisotropy placed between the first polarizing plate and the second polarizing plate, wherein the thickness-direction retardation (Rth1) of the at least one first phase plate is greater than thickness-direction retardation (Rth2') of the additional second phase plate.

The difference between the thickness-direction retardation $\Delta n \cdot d_{lc}$ of the liquid crystal layer in the black display state and total thickness-direction retardation (Rtht) of the plurality of phase plates existing between the first polarizing plate and the second polarizing plate ($\Delta Rth = \Delta n \cdot d_{lc} - Rtht$) preferably satisfies a relationship −100 nm≦$\Delta Rth$≦100 nm, and more preferably satisfies a relationship −50 nm≦$\Delta Rth$≦50 nm.

Preferably, the at least one first phase plate is composed of one first phase plate, and the at least one second phase plate is composed of one second phase plate. In this case, when the liquid crystal display device further includes an additional second phase plate having negative uniaxial optical anisotropy placed between the first phase plate and the first polarizing plate or the second polarizing plate whichever is on the same side as the first phase plate with respect to the liquid crystal layer, the thickness-direction retardation (Rth1) of the first phase plate is preferably greater than thickness-direction retardation (Rth2") of the additional second phase plate.

Preferably, the liquid crystal layer includes a liquid crystal material having negative dielectric anisotropy and presents display in a normally-black mode.

Preferably, the illuminator illuminates the liquid crystal layer with light via the second polarizing plate, and one of the at least one first phase plate is placed between the first polarizing plate and the liquid crystal layer.

The illuminator for illuminating the liquid crystal layer with light via either the first polarizing plate or the second polarizing plate and the polarizing plate via which the illuminator illuminates the liquid crystal layer may be replaced with a polarized light illuminator emitting linearly-polarized light parallel to the transmission axis of the replaced polarizing plate.

BRIEF DESCRIPTION OF THE DRAWINGS

FIGS. 1A and 1B are diagrammatic illustration of liquid crystal display devices 100A and 100B of embodiments of the present invention.

DETAILED DESCRIPTION OF THE INVENTION

Figure 2:
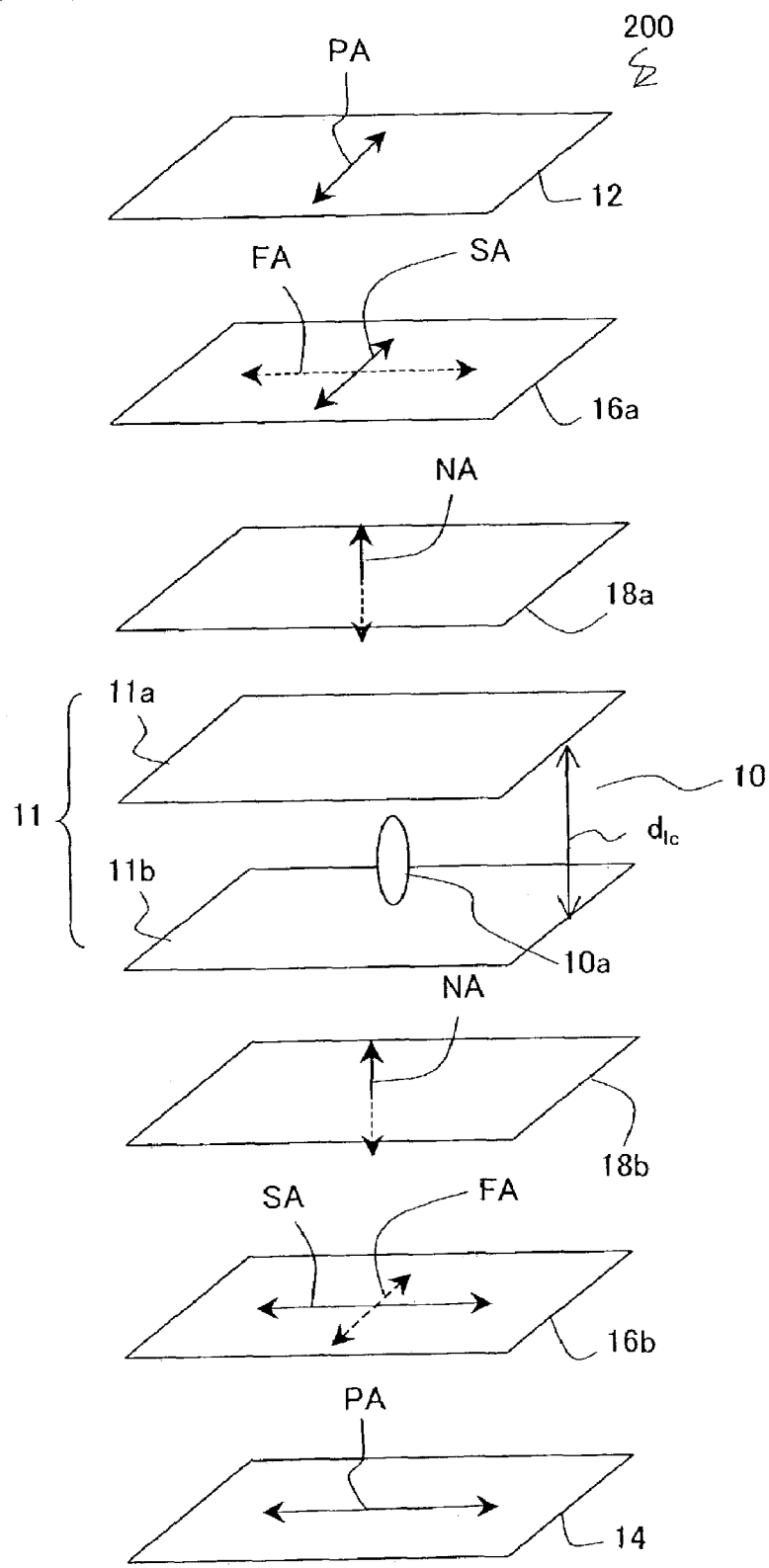
FIG. 2 is a diagrammatic illustration of a liquid crystal display device 200 of another embodiment of the present invention.

Hereinafter, preferred embodiments of the present invention will be described with reference to the relevant drawings.

Referring FIGS. 1A and 1B, the configurations and functions of liquid crystal display devices 100A and 100B of embodiments of the present invention will be described.

The liquid crystal display devices 100A and 100B respectively include a liquid crystal layer 10 that takes on a roughly vertically aligned state in the black display state. FIGS. 1A and 1B show the liquid crystal layer 10 in the black display state, in which liquid crystal molecules 10a of the liquid crystal layer 10 are aligned roughly vertically with respect to the display plane (which is parallel to the surface of the liquid crystal layer).

The aligned state of the liquid crystal layer is controlled by applying a voltage between electrodes 11a and 11b facing each other with the liquid crystal layer 10 therebetween. The liquid crystal layer 10 and the electrodes 11a and 11b constitute a liquid crystal cell 11. The liquid crystal cell 11 may include known components such as alignment films, a color filter layer, and interconnections and switching elements for supply of a predetermined voltage to the electrodes 11a and/or 11b, as required.

When a liquid crystal material having positive dielectric anisotropy, for example, is used to form a 90-degree twisted liquid crystal layer as the liquid crystal layer 10, the roughly vertically aligned state can be obtained by applying a voltage equal to or more than a saturated voltage. When a nematic liquid crystal material having negative dielectric anisotropy is used for the liquid crystal layer 10 and vertically aligned with a vertical alignment film and the like, the roughly vertically aligned state can be obtained during non-voltage application. Note that the "roughly vertically aligned state" as used herein includes the state in which nearly the entire of the liquid crystal layer excluding a layer of liquid crystal molecules anchored to an alignment film and the like is in the vertically aligned state. The electrodes 11a and 11b for applying a voltage across the liquid crystal layer 10 may be a pixel electrode and a counter electrode in an active matrix liquid crystal display device, for example.

The retardation in the thickness direction (thickness-direction retardation) $\Delta n \cdot d_{lc}$ of the liquid crystal layer 10 in the black display state ($\Delta n$ is the birefringence of the liquid crystal layer and $d_{lc}$ is the thickness of the liquid crystal layer) preferably satisfies the relationship 200 nm$\leq \Delta n \cdot d_{lc} \leq$500 nm. By setting the thickness-direction retardation $\Delta n \cdot d_{lc}$ of the liquid crystal layer 10 in the black display state at a value within the above range, the retardation can be effectively compensated by first and second phase plates 16 and 18 to be described later, and thus good black display can be presented.

In particular, it is preferable to use a nematic liquid crystal material having negative dielectric anisotropy as the material of the liquid crystal layer 10 and vertically align the material with a vertical alignment film and the like. By use of this liquid crystal layer, which does not have in-plane retardation in the black display state, the retardation can be compensated by the phase plates satisfactorily, and thus high-quality normally-black mode display is attained.

First and second polarizing plates 12 and 14 are placed to face each other with the liquid crystal layer 10 therebetween in such a manner that the transmission axes (polarization axes) PA thereof are orthogonal to each other. The liquid crystal display devices 100A and 100B, adapted to perform display in the transmission mode, are respectively provided with an illuminator (not shown) for illuminating the liquid crystal layer 10 with light via either the first or second polarizing plate 12 or 14. Assume herein that an illuminator is placed on the lower side of the second polarizing plate 14 as is viewed from FIGS. 1A and 1B. A known fluorescent tube, for example, may be used as the illuminator.

A polarizing plate generally available in the market includes a layer having the polarizing function (polarizing layer) and a layer for supporting the polarizing layer (support layer). The support layer (and/or the polarizing layer) may have optical anisotropy in some cases. In the following description, however, for simplification of the description, assume that the polarizing plates 12 and 14 have only the function of allowing transmission of linearly polarized light of which the vibration plane is parallel to the transmission axis PA. The case considering the support layers of the polarizing plates 12 and 14 having optical anisotropy will be described later in detail.

The liquid crystal display devices 100A and 100B respectively include a first phase plate 16 having biaxial anisotropy and a second phase plate 18 having negative uniaxial anisotropy between the pair of polarizing plates 12 and 14. The optical anisotropy (retardation) of the first phase plate 16 is appropriately set so that the first phase plate 16 is provided with functions of compensating part of the thickness-direction retardation of the liquid crystal layer 10 in the black display state and suppressing light leakage caused by deviation of the transmission axes of the first and second polarizing plates 12 and 14 from the mutual orthogonal relationship when observed in a tilted viewing angle direction. Also, the optical anisotropy (retardation) of the second phase plate 18 is appropriately set so that the second phase plate 18 is provided with a function of compensating the thickness-direction retardation of the liquid crystal layer 10 in the black display state in cooperation with the first phase plate 16.

According to the present invention, the thickness-direction retardation (positive uniaxial optical anisotropy) of the liquid crystal layer 10 in the black display state is not compensated only by the phase plate having negative uniaxial optical anisotropy (second phase plate 18), but the phase plate having biaxial optical anisotropy (first phase plate 16) also has the compensating function. Therefore, the selection range allowed for the first phase plate 16 is widened compared with that for the biaxial anisotropic optical sheet described in the aforementioned publication, and thus good black display can be attained using a phase plate easily available industrially. The first phase plate 16 of the liquid crystal display device of the present invention is distinguished from the biaxial anisotropic optical sheet described in the aforementioned publication in having functions of not only compensating deviation of the transmission axes PA of the polarizing plates 12 and 14 placed in the crossed-Nicols state from the mutual orthogonal relationship when viewed in a tilted viewing angle direction, but also compensating part of the thickness-direction retardation of the liquid crystal layer 10 in the roughly vertically aligned state.

As shown in FIG. 1A, for example, the first phase plate 16 is placed between the liquid crystal layer 10 and the first polarizing plate 12, and the second phase plate 18 is placed between the liquid crystal layer 10 and the second polarizing plate 14. Alternatively, as shown in FIG. 1B, while the first phase plate 16 is placed between the liquid crystal layer 10 and the first polarizing plate 12, the second phase plate 18 may be placed between the liquid crystal layer 10 and the first phase plate 16. The second phase plate 18 is placed somewhere between the first phase plate 16 and either the first polarizing plate 12 or the second polarizing plate 14 whichever is farther from the first phase plate 16 (the polarizing plate 14 in the illustrated examples).

The slower axis (defined as the x axis) SA of the first phase plate 16 having biaxial optical anisotropy is substantially parallel to the transmission axis PA of the polarizing plate 12 placed on the same side with respect to the liquid crystal layer 10. Assume herein that the refractive indices of the first phase plate 16 in the direction of the slower axis SA, in the direction of the faster axis FA (defined as the y axis) and in the thickness (d) direction (parallel to the thickness direction of the liquid crystal layer 10; defined as the z axis) are denoted by nx, ny and nz, respectively. The faster axis FA is in the plane parallel to the liquid crystal layer 10 and including the slower axis SA, and is orthogonal to the slower axis SA. To attain good black display in a tilted viewing angle direction, the thickness-direction retardation (Rth1=(nx−nz)·d) and the in-plane retardation (Re=(nx−ny)·d) of the first phase plate 16 preferably satisfy the relationship 100 nm≦Rth1+1.9·Re≦500 nm, and more preferably satisfy the relationship 200 nm≦Rth1+1.9·Re≦400 nm.

The in-plane retardation Re of the first phase plate 16 preferably satisfies the relationship Re<190 nm, and more preferably satisfies the relationship Re≦150 nm. By setting the in-plane retardation Re at a value less than 190 nm, preferably equal to or less than 150 nm, the margin for alignment between the slower axis SA of the first phase plate 16 and the transmission axis PA of the polarizing plate 12 (and/or the polarizing plate 14) increases. In addition, light leakage that may be observed in the direction normal to the display plane (z-axis direction) in an event of misalignment is suppressed, and thus variation in front contrast ratio is suppressed.

Also, the first phase plate 16 preferably satisfies the relationship nx>ny>nz. In general, optical anisotropy is imparted to a phase plate by drawing a polymer film constituting the phase plate, by casting a polymer solution to a substrate surface, or by other means, to thereby allow polymer chains to be aligned in a film plane (corresponding to the x-y plane of the phase plate). It is therefore difficult to make the refractive index nz in the thickness direction (z-axis direction) greater than the in-plane refractive indices nx and ny. In consideration of this, the phase plate 16 satisfying the relationship nx>ny>nz can be manufactured efficiently industrially, compared with a phase plate satisfying the relationship nx>nz>ny as described in the aforementioned Publication No. 2000-39610. This not only reduces the cost of the phase plate 16, but also suppresses variation of the properties of the phase plate 16. As a result, the final liquid crystal display device can be improved in display quality, and the display quality is suppressed from varying.

Moreover, the first phase plate 16 preferably satisfies the relationship 0 nm<Rth−Re≦100 nm. If Rth−Re, that is, (ny−nz)·d of the first phase plate 16 having biaxial optical anisotropy exceeds 100 nm, it is difficult to control the optical anisotropy during the manufacture of the first phase plate 16. This may increase variations of nx, ny and nz of the first phase plate 16, and as a result, may result in reduction in contrast ratio in a tilted viewing angle direction. The reason for this occurrence is that if a first phase plate 16 with a value of Rth−Re exceeding 100 nm is to be manufactured by biaxial drawing, for example, it is necessary to provide the same degree of drawing in the y-axis direction as that in the x-axis direction. This makes it difficult to adjust nx and ny to predetermined values simultaneously.

The first phase plate 16 satisfying the relationship 0 nm<Rth−Re≦100 nm may be manufactured by a method generally called a roll-to-roll method, for example, in which the polarizing plate 12 and the first phase plate 16 are bonded together, for example. To state more specifically, a long polarizing film in a roll and a long phase film in a roll are continuously bonded together so that the transmission axis of the polarizing film and the slower axis of the phase film are parallel to each other. The bonded polarizing film and phase film are then cut into pieces of a predetermined size, to obtain the polarizing plate 12 and the first phase plate 16 bonded together. This roll-to-roll method is high in productivity, and improves the precision of alignment between the transmission axis PA and the slower axis SA, decreasing variation in optical properties, compared with the case that the first polarizing plate 12 and the first phase plate 16 cut in advance to have their respective predetermined sizes are individually bonded together so that the transmission axis PA and the slower axis SA are parallel to each other. The first phase plate 16 more preferably satisfies the relationship 20 nm<Rth−Re≦80 nm.

As for the second phase plate 18, the negative retardation Rth2 in the thickness direction (NA in FIGS. 1A and 1B) is preferably set so that the difference between the thickness-direction retardation Δn·$d_{lc}$ of the liquid crystal layer 10 and the sum (Rtht) of the thickness-direction retardation Rth1 of the first phase plate 16 and the thickness-direction retardation Rth2 of the second phase plate 18 (ΔRth=Δn·$d_{lc}$−Rtht) satisfies the relationship −100 nm≦ΔRth≦100 nm. More preferably, the second phase plate 18 is set so that the difference satisfies the relationship −50 nm≦ΔRth≦50 nm.

In the case of providing another second phase plate (not shown) having negative uniaxial anisotropy (having thickness-direction retardation Rth2') between the first and second polarizing plates 12 and 14, the total thickness-direction retardation Rtht will be the sum of the thickness-direction retardation of all the phase plates existing between the first and second polarizing plates 12 and 14 (Rtht=Rth1+Rth2+Rth2').

In the aforementioned examples, each one phase plate is provided as the first and second phase plates 16 and 18. Alternatively, like a liquid crystal display device 200 shown in FIG. 2, two first phase plates 16a and 16b and two second phase plates 18a and 18b may be provided. In the case of using two first phase plates as in the liquid crystal display device 200, the first phase plates 16a and 16b are placed so that the respective slower axes SA are parallel to the transmission axes PA of the polarizing plates 12 and 14, respectively, placed on the same side with respect to the liquid crystal layer 10. In the illustrated example, the slower axis SA of the first phase plate 16a is parallel to the transmission axis PA of the first polarizing plate 12, while the slower axis SA of the first phase plate 16b is parallel to the transmission axis PA of the second polarizing plate 14. The slower axes SA of the first phase plates 16a and 16b are therefore orthogonal to each other, and thus the x axis and the y axis defining the retardation relationship described above are respectively orthogonal between the two first phase plates 16a and 16b. The thickness-direction retardation (Rth1=(nx−nz)·d) and the in-plane retardation (Re=(nx−ny)·d) of the first phase plate 16 described above with reference to FIGS. 1A and 1B respectively correspond to the sum of Rth1 and the sum of Re calculated from the values of nx, ny and nz and the thickness d of the respective first phase plates 16a and 16b in FIG. 2. Preferably, the values of nx, ny and nz of the two first phase plates 16a and 16b are respectively equal to each other, but may be different from each other. In this case, also, the values of nx, ny and nz of the first phase plates 16a and 16b preferably satisfy the relationship nx>ny>nz.

Likewise, the thickness-direction retardation Rth2 of the second phase plate 18 described above corresponds to the sum of Rth2 of the two second phase plates 18a and 18b having negative uniaxial optical anisotropy.

As described above, each of the first and second phase plates may be provided in plural number. However, the number of the phase plates is preferably smaller. Increase in number will increase the number of steps for alignment of the optic axes (slower axes and faster axes) of the respective phase plates with the transmission axes of the polarizing plate 12 and/or the polarizing plate 14. This may cause a problem of quality degradation due to misalignment and entering of dust between phase plates or between a phase plate and a polarizing plate bonded together.

In particular, a single first phase plate having biaxial optical anisotropy is preferred. Also, a single second phase plate having negative uniaxial anisotropy is preferred. However, as described earlier, a triacetyl-cellulose (TAC) layer, widely used as the support layer of the polarizing plates 12 and 14, has negative uniaxial anisotropy (thickness-direction retardation of about 20 nm to about 70 nm) and thus functions as a second phase plate. In reality, therefore, the liquid crystal display device includes a total of three second phase plates. The polarizing plates 12 and 14 (including the TAC layers) are often used for various types of liquid crystal display devices. Therefore, the thickness-direction retardation (Rth2) of the second phase plate 18 in the configurations shown in FIGS. 1A and 1B should preferably be set appropriately depending on the type of the liquid crystal display device. The TAC layer is provided for each of the polarizing plates 12 and 14. Therefore, Rtht in the condition ($\Delta$Rth=$\Delta$n·$d_{lc}$-Rtht) to be considered in the setting of the thickness-direction retardation Rth2 of the second phase plate 18 described above, for example, includes Rth1 of the first phase plate 16, Rth2 of the second phase plate 18, and the total retardation (Rth2') of the TAC layers of the polarizing plates 12 and 14.

As shown in FIGS. 1A and 1B, the second phase plate 18 is preferably placed somewhere between the first phase plate 16 and either the first polarizing plate 12 or the second polarizing plate 14 whichever is farther from the first phase plate 16 (the polarizing plate 14 in the illustrated examples). In other words, the second phase plate 18 should not preferably be placed between the first phase plate 16 and either the first polarizing plate 12 or the second polarizing plate 14 whichever is on the same side as the first phase plate 16 with respect to the liquid crystal layer 10 (the polarizing plate 12 in the illustrated examples).

The reason is that if the second phase plate 18 having the retardation Rth2 that is greater than the thickness-direction retardation Rth1 of the first phase plate 16 is placed between the first phase plate 16 and the polarizing plate 12 that is nearer to the first phase plate 16, the effect of improving the quality of black display in a tilted viewing angle direction may decrease. In view of this, the retardation of the TAC layer of the polarizing layer 12 placed nearer to the first phase plate 16, denoted by Rth2", should preferably satisfy the relationship Rth1>Rth2". In general, the retardation of the polarizing plates 12 and 14 (support layers) is 70 nm or less. Therefore, as for the TAC layer, the problem described above will not occur. The total retardation Rth2' of the TAC layers of the polarizing plates 12 and 14 is preferably smaller than the sum of the thickness-direction retardation Rth1 of the first phase plate 16 and the thickness-direction retardation Rth2 of the second phase plate 18 (Rth1+Rth2>Rth2').

Considering the heat resistance of the phase plates, the first and second phase plates 16 and 18 are preferably placed on the side opposite to the illuminator (not shown) with respect to the liquid crystal layer 10. In particular, the first phase plate 16 having biaxial anisotropy should preferably be placed on the side opposite to the illuminator with respect to the liquid crystal layer 10.

The embodiments described above assume use of an illuminator emitting non-polarized light, such as a fluorescent tube, for example. In the case of using an illuminator emitting linearly-polarized light, the illuminator and the polarizing plate 12 or 14 whichever is closer to the illuminator may be replaced with a polarized light illuminator emitting linearly-polarized light parallel to the transmission axis of the replaced polarizing plate.

Next, the liquid crystal display device 100A shown in FIG. 1A will be described in a more concrete manner with respect to the relationship between the configuration and properties thereof. Hereinafter, for systematic description of the feature of the embodiment, discussion will be made based on simulation results. Note that the validity of the simulations was confirmed by experiments.

As the polarizing plates 12 and 14, used were polarizing plates each including a TAC layer and having negative uniaxial anisotropy. The thickness-direction retardation of the TAC layers was assumed as 50 nm each, that is, 100 nm in total. As the illuminator, a known backlight having a fluorescent tube was used, which was placed on the lower side of the polarizing plate 14 as is viewed from FIG. 1A.

A nematic liquid crystal material having negative dielectric anisotropy was used for the liquid crystal layer 10, and examination was made for three cases of the thickness-direction retardation of the liquid crystal 10 in the black display state, 249 nm, 369 nm and 408 nm.

The light leakage (light transmittance) in a tilted viewing angle direction in the black display state was measured by simulations for various cases of configurations using the polarizing plates 12 and 14, the liquid crystal layer 10, and the first and second phase plates 16 and 18 having different retardation values. The direction in which the display plane was observed was set so that the azimuth from the transmission axis PA of the observer-side polarizing plate 12 was 45° and the viewing angle (angle from the normal to the display plane) was 60°.

Table 1 below shows details of the cases of configurations found small in light leakage in the tilted viewing angle direction in the black display state as a result of the simulations, including the thickness-direction retardation $\Delta$n·d of the liquid crystal layer 10, the in-plane retardation Re and the thickness-direction retardation Rth1 of the first phase plate 16, the thickness-direction retardation Rth2 of the second phase plate 18, the total retardation Rht2' of the TAC layers of the polarizing plates 12 and 14, the total thickness-direction retardation Rtht of the phase plates (including the TAC layers), and the difference between $\Delta$n·d and Rtht.

TABLE 1

| LC layer Δn·d | Biaxial PP Re | Biaxial PP Rth1 | Negative uniaxial PP Rth2 | TAC × 2 Rth2' | Total Rth (Rth1 + Rth2 + Rth2') Rtht | Δn · d-Rtht Δ Rth |
|---|---|---|---|---|---|---|
| 249 | 75  | 160 | 20  | 100 | 280 | −31 |
| 249 | 75  | 150 | 30  | 100 | 280 | −31 |
| 249 | 85  | 140 | 50  | 100 | 290 | −41 |
| 249 | 85  | 130 | 60  | 100 | 290 | −41 |
| 249 | 105 | 100 | 110 | 100 | 310 | −61 |
| 369 | 75  | 160 | 130 | 100 | 390 | −21 |
| 369 | 75  | 150 | 140 | 100 | 390 | −21 |
| 369 | 80  | 140 | 150 | 100 | 390 | −21 |
| 369 | 90  | 130 | 170 | 100 | 400 | −31 |
| 369 | 90  | 120 | 180 | 100 | 400 | −31 |
| 369 | 95  | 110 | 190 | 100 | 400 | −31 |
| 369 | 105 | 100 | 210 | 100 | 410 | −41 |
| 408 | 75  | 160 | 150 | 100 | 410 | −2  |
| 408 | 80  | 150 | 170 | 100 | 420 | −12 |
| 408 | 85  | 140 | 180 | 100 | 420 | −12 |
| 408 | 85  | 130 | 190 | 100 | 420 | −12 |
| 408 | 105 | 100 | 240 | 100 | 440 | −32 |

Figure 3:
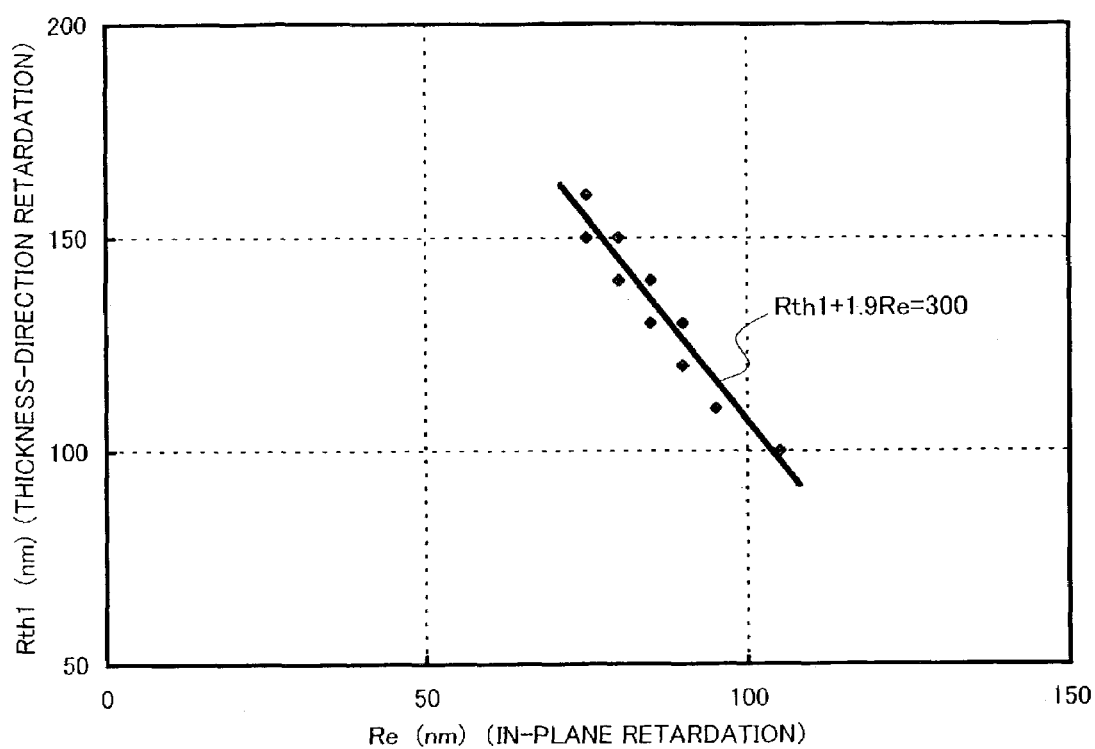
FIG. 3 is a graph showing the relationship between in-plane retardation Re and thickness-direction retardation Rth1 of a first phase plate 16 suitably used for the liquid crystal display devices of the embodiments of the present invention.

FIG. 3 shows the results of plotting of Re and Rth1 of the first phase plate 16 for the configurations smallest in light leakage in the black display state among the configurations providing the above results.

From the results of FIG. 3, it is found that the light leakage is smallest when Re and Rth1 of the first phase plate 16 satisfy the relationship represented by the straight line: Rth1+1.9·Re=300 (nm). The configurations shown in Table 1 and FIG. 3 were also small in light leakage in the normal direction in the black display state and thus high in front contrast ratio.

Based on the results described above, the range of Re and Rth1 of the first phase plate 14 within which display with a contrast ratio of 10 or more can be attained in the observation direction described above (azimuth: 45°, viewing angle: 60°) was determined. The results are shown in FIG. 4.

Figure 4:
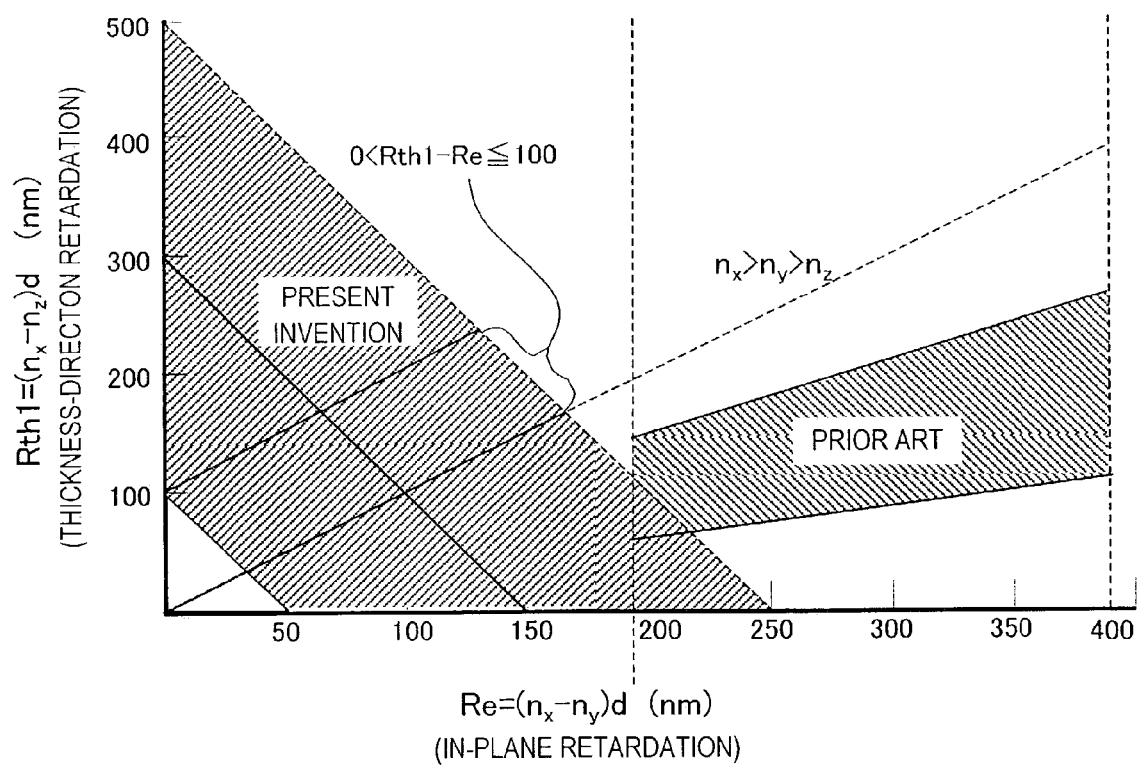
FIG. 4 is a graph showing a preferred range of the in-plane retardation Re and the thickness-direction retardation Rth1 of the first phase plate 16 suitably used for the liquid crystal display devices of the embodiments of the present invention.

FIG. 4 shows, in addition to the range of Re and Rth1 within which a contrast ratio of 10 or more is attainable (present invention), the preferred range of the retardations (corresponding to Re and Rth1) of the biaxial anisotropic optical sheet described in the aforementioned Publication No. 2000-39610 (prior art).

As is found from FIG. 4, as for the conventional biaxial anisotropic optical sheet, the in-plane retardation is 190 nm or more and the preferred range is within the range satisfying nx>nz>ny (below the dashed line in FIG. 4). Therefore, the prior art has problems that the selection range allowed for the biaxial anisotropy optical sheet capable of presenting good black display is narrow and that it is difficult to industrially manufacture an optical sheet having refractive index anisotropy of nx>nz>ny. The prior art has also a problem that light leakage tends to occur in the normal direction in the black display state because the in-plane retardation is as large as 190 nm or more.

The range of Re and Rth1 of the first phase plate 16 suitably used according to the present invention, which is different from the range of those of the conventional biaxial anisotropic optical sheet, enables suppression/prevention of occurrence of the above problems. That is, according to the present invention, the selection range allowed for the first phase plate 16 capable of presenting good black display is wide, and it is possible to use a phase plate having optical anisotropy of nx>ny>nz that is industrially easily manufactured.

In particular, a first phase plate 16 satisfying the relationship 0 nm<Rth−Re≦100 nm can be manufactured efficiently with a small variation in optical anisotropy. Moreover, by adopting the roll-to-roll method, by which the first phase plate 16 can be formed integrally with the first polarizing plate 12, not only the productivity but also the alignment precision can be increased. This contributes to improvement of the display quality of the liquid crystal display device 100A.

In addition, by setting the in-plane retardation Re of the first phase plate 16 below 190 nm, the variation in front contrast ratio can be suppressed.

As for the second phase plate 18 having negative uniaxial anisotropy, by setting the thickness-direction retardation so that the relationship −100 nm≦ΔRth≦100 nm is satisfied, a contrast ratio of 10 or more in the observation direction described above is attainable. For further improvement in contrast ratio, setting of the thickness-direction retardation so as to satisfy the relationship −50 nm≦ΔRth≦50 nm is more preferable. Naturally, the idealistic value of ΔRth is zero.

Although the simulation results for the liquid crystal display device 100A shown in FIG. 1A were used in the above description, the retardation relationship discussed above also holds for the configurations described with reference to FIGS. 1B and 2. Although the liquid crystal layer 10 is preferably a vertically aligned liquid crystal layer having negative dielectric anisotropy, it is also possible to use various types of liquid crystal layers, such as a TN liquid crystal layer, presenting black display in a roughly vertically aligned state.

According to the present invention, a liquid crystal display device that presents black display when the liquid crystal layer thereof is in a roughly vertically aligned state can be improved in display quality by use of a biaxial phase plate excellent in productivity.

The liquid crystal display device of the present invention having good display quality is suitable for applications demanding high definition, in particular, such as liquid crystal monitors and liquid crystal TV sets.

While the present invention has been described in preferred embodiments, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

What is claimed is:

1. A liquid crystal display device comprising:
a liquid crystal layer taking on a roughly vertically aligned state in a black display state;
first and second polarizing plates placed to face each other via the liquid crystal layer so that transmission axes of the polarizing plates are substantially orthogonal to each other;
at least one first phase plate placed between the liquid crystal layer and the first polarizing plate and/or the second polarizing plate;
at least one second phase plate placed between the at least one first phase plate, and the first polarizing plate or the second polarizing plate whichever is farther from the at least one first phase plate; and
an illuminator for illuminating the liquid crystal layer with light,
wherein the at least one first phase plate has biaxial optical anisotropy and an in-plane retardation Re<190 nm, and has functions of compensating part of thickness-direction retardation of the liquid crystal layer in the black display state and suppressing light leakage caused by deviation of the transmission axes of the first polarizing plate and the second polarizing plate from mutual orthogonal relationship in a tilted viewing angle direction,
the at least one second phase plate has negative uniaxial optical anisotropy and has a function of compensating the thickness-direction retardation of the liquid crystal layer in the black display state in cooperation with the at least one first phase plate,
wherein the liquid crystal layer includes a liquid crystal material having negative dielectric anisotropy and presents display in a normally-black mode; and
wherein the illuminator illuminates the liquid crystal layer with light via the second polarizing plate, and the at least one first phase plate is placed between the first polarizing plate and the liquid crystal layer.

2. The device of claim 1, wherein a thickness-direction retardation (Rth1=(nx−nz)·d) and in-plane retardation (Re=(nx−ny)·d) of the first phase plate satisfy a relationship 200≦Rth1+1.9·Re≦500 nm.

3. A liquid crystal display device comprising:
a liquid crystal layer taking on a roughly vertically aligned state in a black display state;
first and second polarizing plates placed to face each other via the liquid crystal layer so that transmission axes of the polarizing plates are substantially orthogonal to each other;
at least one first phase plate placed between the liquid crystal layer and the first polarizing plate and/or the second polarizing plate;
at least one second phase plate placed between the at least one first phase plate, and the first polarizing plate or the second polarizing plate whichever is farther from the at least one first phase plate; and
an illuminator for illuminating the liquid crystal layer with light,
wherein the at least one first phase plate has biaxial optical anisotropy and an in-plane retardation Re<190 mm and has functions of compensating part of thickness-direction retardation of the liquid crystal layer in the black display state and suppressing light leakage caused by deviation of the transmission axes of the first polarizing plate and the second polarizing plate from mutual orthogonal relationship in a tilted viewing angle direction, the at least one second phase plate has negative uniaxial optical anisotropy and has a function of compensating the thickness-direction retardation of the liquid crystal layer in the black display state in cooperation with the at least one first phase plate,
wherein the liquid crystal layer includes a liquid crystal material having negative dielectric anisotropy and presents display in a normally-black mode; and
wherein the illuminator for illuminating the liquid crystal layer with light via either the first polarizing plate or the second polarizing plate and the polarizing plate via which the illuminator illuminates the liquid crystal layer are replaced with a polarized light illuminator emitting linearly-polarized light parallel to the transmission axis of the replaced polarizing plate.

4. A liquid crystal display device comprising:
a liquid crystal layer taking on a roughly vertically aligned state in a black display state;
first and second polarizing plates placed to face each other via the liquid crystal layer so that transmission axes of the polarizing plates are orthogonal to each other;
at least one first phase plate placed between the liquid crystal layer and the first polarizing plate and/or the second polarizing plate;
at least one second phase plate placed between the at least one first phase plate and the first polarizing plate or the second polarizing plate whichever is farther from the at least one first phase plate; and
an illuminator for illuminating the liquid crystal layer with light via either the first polarizing plate or the second polarizing plate,
wherein thickness-direction retardation of the liquid crystal layer in the black display state, $\Delta n \cdot d_{1c}$ (where $\Delta n$ is a birefringence of the liquid crystal layer and $d_{1c}$ is a thickness of the liquid crystal layer), satisfies a relationship 200 nm≦$\Delta n \cdot d_{1c}$≦500 nm,
the at least one first phase plate has biaxial optical anisotropy, and a slower axis of the at least one first phase plate is substantially parallel to the transmission axis of the first polarizing plate or the second polarizing plate whichever is on the same side as the at least one first phase plate with respect to the liquid crystal layer,
thickness-direction retardation (Rth1=(nx−nz)·d) and in-plane retardation (Re=(nx−ny)·d) of the at least one first phase plate satisfy relationships 100 nm≦Rth1+1.9·Re≦500 nm and Re<190 nm where nx, ny and nz are refractive indices of the at least one first phase plate in the direction of the slower axis, in the direction of a faster axis and in the direction of a thickness (d), respectively, the faster axis being in a plane including the slower axis and parallel to the liquid crystal layer and being orthogonal to the slower axis, and
wherein the liquid crystal layer includes a liquid crystal material having negative dielectric anisotropy and presents display in a normally-black mode.

5. The liquid crystal display device of claim 4, wherein the at least one first phase plate satisfies a relationship nx>ny>nz.

6. The liquid crystal display device of claim 4, further comprising an additional second phase plate having negative uniaxial optical anisotropy placed between the first polarizing plate and the second polarizing plate,
wherein the thickness-direction retardation (Rth1) of the at least one first phase plate is greater than thickness-direction retardation (Rth2') of the additional second phase plate.

7. The liquid crystal display device of claim 4, wherein the difference between the thickness-direction retardation $\Delta n \cdot d_{1c}$ of the liquid crystal layer in the black display state and total thickness-direction retardation (Rtht) of the plurality of phase plates existing between the first polarizing plate and the second polarizing plate ($\Delta Rth = \Delta n \cdot d_{1c} - Rtht$) satisfies a relationship $-100 \text{ nm} \leq \Delta Rth \leq 100 \text{ nm}$.

8. The liquid crystal display device of claim 4, wherein the at least one first phase plate is composed of one phase plate, and the at least one second phase plate is composed of one phase plate.

9. The liquid crystal display device of claim 8, further comprising an additional second phase plate having negative uniaxial optical anisotropy placed between the first phase plate and the first polarizing plate or the second polarizing plate whichever is on the same side as the first phase plate with respect to the liquid crystal layer,
wherein the thickness-direction retardation (Rth1) of the first phase plate is greater than thickness-direction retardation (Rth2″) of the additional second phase plate.

10. The liquid crystal display device of claim 4, wherein the illuminator illuminates the liquid crystal layer with light via the second polarizing plate, and one of the at least one first phase plate is placed between the first polarizing plate and the liquid crystal layer.

11. The liquid crystal display device of claim 4, wherein the illuminator for illuminating the liquid crystal layer with light via either the first polarizing plate or the second polarizing plate and the polarizing plate via which the illuminator illuminates the liquid crystal layer are replaced with a polarized light illuminator emitting linearly-polarized light parallel to the transmission axis of the replaced polarizing plate.

12. The device of claim 4, wherein a thickness-direction retardation (Rth1=(nx−nz)·d) and in-plane retardation (Re=(nx−ny)·d) of the first phase plate satisfy a relationship $200 \leq Rth1 + 1.9 \cdot Re \leq 500 \text{ nm}$.

13. A liquid crystal display device comprising:
a liquid crystal layer taking on a roughly vertically aligned state in a black display state;
first and second polarizing plates placed to face each other via the liquid crystal layer so that transmission axes of the polarizing plates are substantially orthogonal to each other;
at least one first phase plate placed between the liquid crystal layer and the first polarizing plate and/or the second polarizing plate;
at least one second phase plate placed between the at least one first phase plate and the first polarizing plate or the second polarizing plate whichever is farther from the at least one first phase plate; and
an illuminator for illuminating the liquid crystal layer,
wherein thickness-direction retardation of the liquid crystal layer in the black display state, $\Delta n \cdot d_{1c}$ (where $\Delta n$ is a birefringence of the liquid crystal layer and $d_{1c}$ is a thickness of the liquid crystal layer), satisfies a relationship $200 \text{ nm} \leq \Delta n \cdot d_{1c} \leq 500 \text{ nm}$,
the at least one first phase plate has biaxial optical anisotropy, and a slower axis (x axis) of the at least one first phase plate is substantially parallel to the transmission axis of the first polarizing plate or the second polarizing plate whichever is on the same side as the at least one first phase plate with respect to the liquid crystal layer,
wherein thickness-direction retardation (Rth1=(nx−nz)·d) and in-plane retardation (Re=(nx−ny)·d) of the at least one first phase plate satisfy relationships 100 nm≤Rth1+1.9·Re≤500 nm and nx>ny>nz where nx, ny and nz are refractive indices of the at least one first phase plate in the direction of the slower axis, in the direction of a faster axis and in the direction of a thickness (d), respectively, the faster axis being in a plane including the slower axis and parallel to the liquid crystal layer and being orthogonal to the slower axis, and
wherein the liquid crystal layer includes a liquid crystal material having negative dielectric anisotropy and presents display in a normally-black mode.

14. The liquid crystal display device of claim 13, wherein the in-plane retardation Re of the at least one first phase plate satisfies a relationship Re<190 nm.

15. The liquid crystal display device of claim 13, further comprising an additional second phase plate having negative uniaxial optical anisotropy placed between the first polarizing plate and the second polarizing plate,
wherein the thickness-direction retardation (Rth 1) of the at least one first phase plate is greater than thickness-direction retardation (Rth2′) of the additional second phase plate.

16. The liquid crystal display device of claim 13, wherein the difference between the thickness-direction retardation $\Delta n \cdot d_{1c}$ of the liquid crystal layer in the black display state and total thickness-direction retardation (Rtht) of the plurality of phase plates existing between the first polarizing plate and the second polarizing plate ($\Delta Rth = \Delta n \cdot d_{1c} - Rtht$) satisfies a relationship $-100 \text{ nm} \leq \Delta Rth \leq 100 \text{ nm}$.

17. The liquid crystal display device of claim 13, wherein the at least one first phase plate is composed of one first phase plate, and the at least one second phase plate is composed of one second phase plate.

18. The liquid crystal display device of claim 17, further comprising an additional second phase plate having negative uniaxial optical anisotropy placed between the first phase plate and the first polarizing plate or the second polarizing plate whichever is on the same side as the first phase plate with respect to the liquid crystal layer,
wherein the thickness-direction retardation (Rth1) of the first phase plate is greater than thickness-direction retardation (Rth2″) of the additional second phase plate.

19. The liquid crystal display device of claim 13, wherein the illuminator illuminates the liquid crystal layer with light via the second polarizing plate, and one of the at least one first phase plate is placed between the first polarizing plate and the liquid crystal layer.

20. The liquid crystal display device of claim 13, wherein the illuminator for illuminating the liquid crystal layer with light via either the first polarizing plate or the second polarizing plate and the polarizing plate via which the illuminator illuminates the liquid crystal layer are replaced with a polarized light illuminator emitting linearly-polarized light parallel to the transmission axis of the replaced polarizing plate.

21. The liquid crystal display device of claim 13, wherein the thickness-direction retardation (Rth1=(nx−nz)·d) and the in-plane retardation (Re=(nx−ny)·d) of the at least one first phase plate satisfy relationship $200 \text{ nm} \leq Rth1 + 1.9 \cdot Re \leq 500 \text{ nm}$.

22. A liquid crystal display device comprising:
a liquid crystal layer taking on a substantially vertically aligned state in a black display state;
first and second polarizing layers placed to face each other via the liquid crystal layer so that transmission axes of the polarizing layers are substantially orthogonal to each other;
at least one first phase plate having biaxial optical anisotropy; and
at least one second phase plate having negative uniaxial optical anisotropy,
an illuminator for illuminating the liquid crystal layer with light;
wherein the at least one first phase plate includes a first phase plate provided between the first polarizing layer and the liquid crystal layer,
wherein the at least one second phase plate includes a second phase plate provided between the second polarizing layer and the first phase plate that is provided between the first polarizing layer and the liquid crystal layer;
wherein the at least one first phase plate has functions of compensating part of thickness-direction retardation of the liquid crystal layer in the black display state and suppressing light leakage caused by deviation of the transmission axes of the first polarizing layer and the second polarizing layer from mutual orthogonal relationship in a tilted viewing angle direction, and a sum of an in-plane retardation of the at least one first phase plate Re is less than 190 nm;

wherein the at least one second phase plate has a function of compensating the thickness-direction retardation of the liquid crystal layer in the black display state in cooperation with the at least one first phase plate, the at least one second phase plate including one or more second phase plates present on one side of the liquid crystal layer and zero or more second phase plates on another side of the liquid crystal layer, and the liquid crystal layer is not equal to a sum of a thickness-direction retardation of the zero or more second phase plates present on the other side of the liquid crystal layer;

wherein the liquid crystal layer includes a liquid crystal material having negative dielectric anisotropy, the display device presenting display in a normally-black mode; and wherein the illuminator illuminates the liquid crystal layer with light via the second polarizing plate, and the at least one first phase plate is placed between the first polarizing plate and the liquid crystal layer.

23. A liquid crystal display device comprising:

a liquid crystal layer taking on a substantially vertically aligned state in a black display state;

first and second polarizing layers placed to face each other via the liquid crystal layer so that transmission axes of the polarizing layers are substantially orthogonal to each other;

at least one first phase plate having biaxial optical anisotropy;

at least one second phase plate having negative uniaxial optical anisotropy; and an illuminator for illuminating the liquid crystal layer with light, wherein thickness-direction retardation of the liquid crystal layer in the black display state, $\Delta n \cdot d_{LC}$ (where $\Delta n$ is a birefringence of the liquid crystal layer and $d_{LC}$ is a thickness of the liquid crystal layer) satisfies a relationship 200 nm$<=\Delta n \cdot d_{LC}<=$500 nm;

wherein the at least one first phase plate includes a first phase plate provided between the first polarizing layer and the liquid crystal layer, a slower axis of the first phase plate being substantially parallel to the transmission axis of the first polarizing layer;

wherein the at least one second phase plate includes a second phase plate provided between the second polarizing layer and the first phase plate that is provided between the first polarizing layer and the liquid crystal layer;

wherein a sum of a thickness direction retardation (Rth1= $(nx-nz) \cdot d$) and a sum of an in-plane retardation (Re= $(nx-ny) \cdot d$) of the at least one first phase plate satisfy relationships 100 nm$<=$Rth1+1.9Re$<=$500 nm and Re<190 nm, where nx, ny and nz are refractive indices of the at least one first phase plate in the direction of the slower axis, in the direction of a faster axis, and in the direction of a thickness (d), respectively, the faster axis being in a plane including the slower axis and parallel to the liquid crystal layer and being substantially orthogonal to the slower axis;

wherein the at least one second phase plate includes one or more second phase plates present on one side of the liquid crystal layer and zero or more second phase plates on another side of the liquid crystal layer, and wherein a sum of a thickness-direction retardation of the one or more second phase plates present on the one side of the liquid crystal layer is not equal to a sum of a thickness-direction retardation of the zero or more second phase plates present on the other side of the liquid crystal layer; and wherein the liquid crystal layer includes a liquid crystal material having negative dielectric anisotropy, the display device presenting display in a normally-black mode.

24. A liquid crystal display device comprising:

a liquid crystal layer taking on a substantially vertically aligned state in a black display state;

first and second polarizing layers placed to face each other via the liquid crystal layer so that transmission axes of the polarizing layers are substantially orthogonal to each other;

at least one first phase plate having biaxial optical anisotropy;

at least one second phase plate having negative uniaxial optical anisotropy; and an illuminator for illuminating the liquid crystal layer with light, wherein thickness-direction retardation of the liquid crystal layer in the black display state, $\Delta n \cdot d_{LC}$ (where $\Delta n$ is a birefringence of the liquid crystal layer and $d_{LC}$ is a thickness of the liquid crystal layer) satisfies a relationship 200 nm$<=\Delta n \cdot d_{LC}<=$500 nm;

wherein the at least one first phase plate includes a first phase plate provided between the first polarizing layer and the liquid crystal layer, a slower axis of the first phase plate being substantially parallel to the transmission axis of the first polarizing layer;

wherein the at least one second phase plate includes a second phase plate provided between the second polarizing layer and the first phase plate that is provided between the first polarizing layer and the liquid crystal layer;

wherein a sum of a thickness direction retardation (Rth1= $(nx-nz) \cdot d$) and a sum of an in-plane retardation (Re= $(nx-ny) \cdot d$) of the at least one first phase plate satisfy relationships 100 nm$<=$Rth1+1.9Re$<=$500 rim and nx>ny>nz, where nx, ny and nz are refractive indices of the at least one first phase plate in the direction of the slower axis, in the direction of a faster axis, and in the direction of a thickness (d), respectively, the faster axis being in a plane including the slower axis and parallel to the liquid crystal layer and being substantially orthogonal to the slower axis;

wherein the at least one second phase plate includes one or more second phase plates present on one side of the liquid crystal layer and zero or more second phase plates on another side of the liquid crystal layer, and wherein a sum of a thickness-direction retardation of the one or more second phase plates present on the one side of the liquid crystal layer is not equal to a sum of a thickness-direction retardation of the zero or more second phase plates present on the other side of the liquid crystal layer; and wherein the liquid crystal layer includes a liquid crystal material having negative dielectric anisotropy, the display device presenting display in a normally-black mode.

* * * * *